Aug. 31, 1948.  L. BISHOP  2,448,074
LAWNMOWER

Filed May 8, 1944  3 Sheets-Sheet 1

Lewis Bishop
INVENTOR.

BY
ATTORNEYS.

Aug. 31, 1948. L. BISHOP 2,448,074
LAWNMOWER
Filed May 8, 1944 3 Sheets-Sheet 2

INVENTOR.
Lewis Bishop
BY
CA Knowles.
ATTORNEYS.

Aug. 31, 1948.  L. BISHOP  2,448,074
LAWNMOWER
Filed May 8, 1944  3 Sheets-Sheet 3
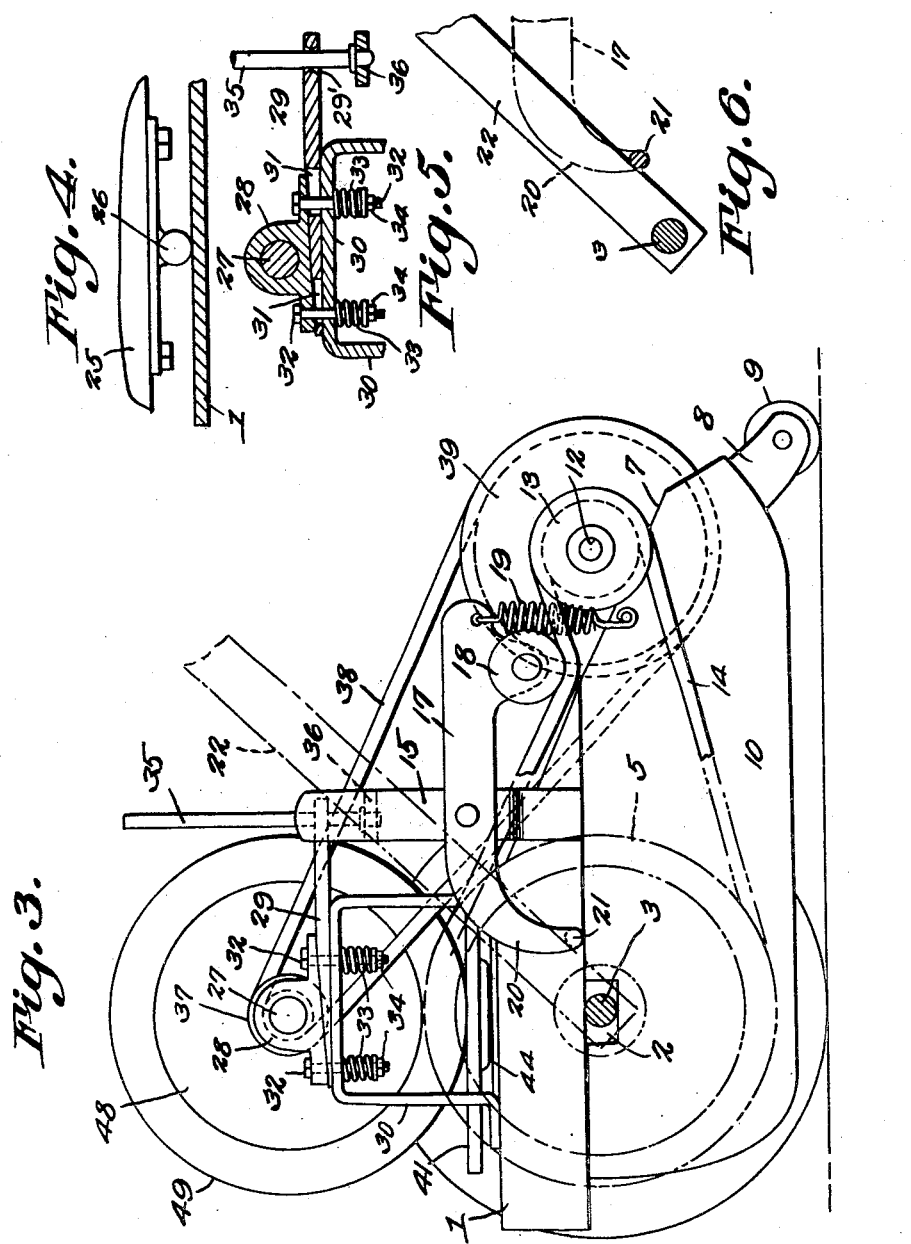
Lewis Bishop
INVENTOR.
BY
ATTORNEYS.

Patented Aug. 31, 1948

2,448,074

UNITED STATES PATENT OFFICE 2,448,074

LAWN MOWER

Lewis Bishop, Arcadia, Fla.

Application May 8, 1944, Serial No. 534,630

1 Claim. (Cl. 56—25.4)

This invention relates to lawn mowers of the type utilizing a rotary cutter and power driven, one of the objects being to provide new and novel means whereby the operation of the cutter can be maintained at all times under full control of the operator.

A further object is to provide a device of this type including a friction drive with which is combined a means for varrying the pressure of the friction members upon each other.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 3 is a side elevation, one of the drive wheels being removed.

Figure 4 is a view partly in side elevation and partly in section of the tiltable connection between the motor and its supporting platform.

Figure 5 is a view in section showing the means employed for adjusting the motor to regulate the pressure of the friction drive members, one upon the other.

Figure 6 is a sectional view showing the means employed for controlling the forward movement of the lawn mower.

Figure 1:
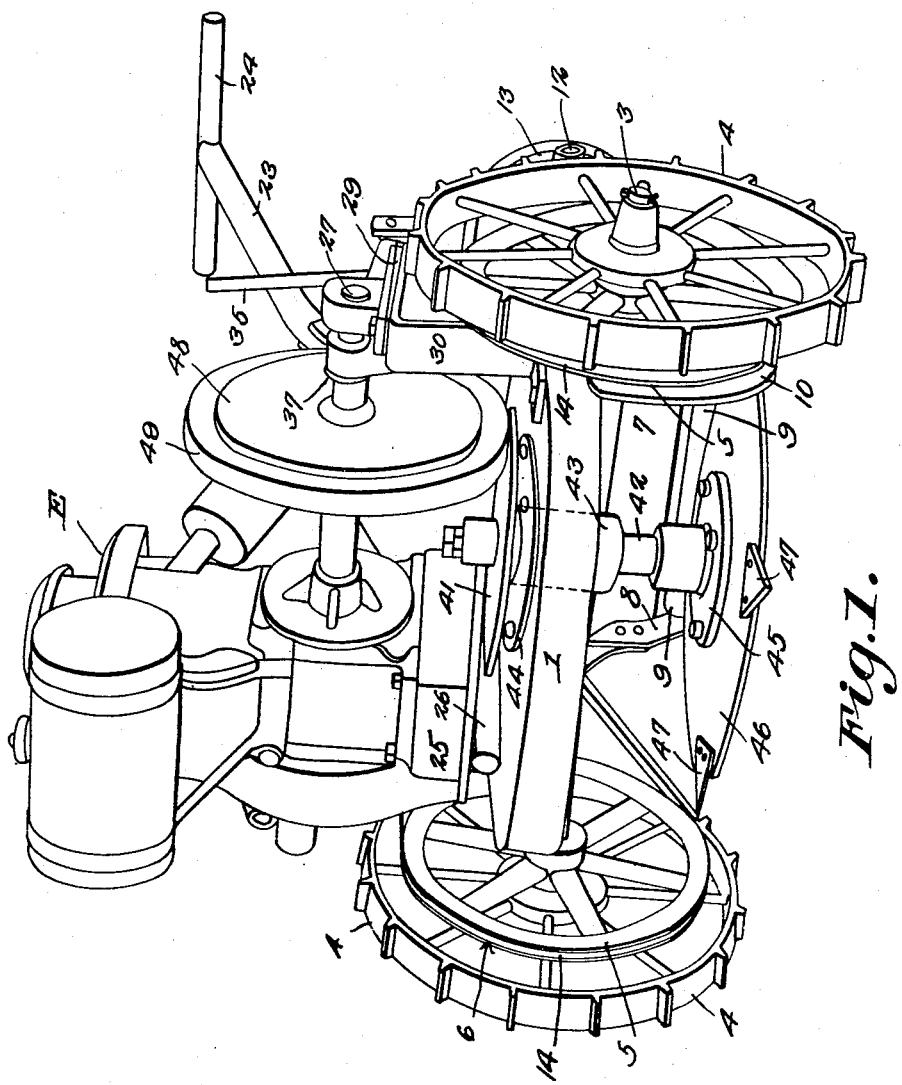
Figure 1 is a front perspective view of the complete lawn mower.

Referring to the figures by characters of reference, 1 designates the body or platform of the apparatus, the same being provided with bearings 2 in which is mounted a shaft 3 supported by ground-engaging wheels 4. Rotatable with each of these wheels and located at the inner side thereof is a driven wheel 5 having an annular groove 6 in its periphery.

A rearwardly and downwardly extended shield or hood 7 is carried by the platform or body 1 and is provided at its sides with arms 8 between which is journalled a roller 9 for contact with the surface of the ground. A guard plate 10 extends downwardly from one side of the platform and hood or shield and is spaced inwardly from the adjacent wheel 5.

Bearings 11 are mounted on the shield or hood 7 close to the sides thereof and support a counter- shaft 12 each end of which has a grooved pulley 13 secured thereto so as to rotate with the shaft. Belts 14 are mounted on these pulleys and also on the respective wheels 5 and constitute means for transmitting motion from shaft 12 to the wheels.

Also secured to the side portions of the hood, close to the body or platform 1, are posts 15 and 16 to each of which is pivotally connected a lever 17 carrying a belt-tightening roller 18 which is normally pressed onto the upper flight of one of the belts 14 by a spring 19 one end of which is attached to the lever while the other end is attached to the adjacent side of the hood 7.

The other or forward ends of the levers 17 are downturned as indicated at 20 and are provided with lugs 21 extended laterally under a yoke 22 which straddles the body or platform 1 and is pivotally mounted on the axle 3. This yoke constitutes the lower end or forward portion of a handle the upper portion of which is in the form of a shank 23 of any suitable length which can be provided with a handle 24 whereby it can be manipulated readily by the operator. This handle is used for guiding the lawn mower and also for operating the belt tighteners. It will be apparent that when the handle is pushed downwardly, the yoke will thrust downwardly on the lugs 21 and cause the belt-tightening wheels 18 to lift against the action of their springs 19, thereby loosening the belts 14 so that they will slip on their pulleys. However, when the handle is pushed upwardly, the action will be reversed, yoke 22 being moved away from the lugs or fingers 21 so that springs 19 thus can pull the levers 17 downwardly and press the anti-friction rollers 18 firmly against the belt to take up slack therein.

An internal combustion engine has been indicated generally at E, and includes a base 25 to the bottom of which is welded or otherwise joined a bearing rod 26 extending from front to back of the base and resting on the body or platform 1. This rod supports the motor so that it can tilt laterally thereon. The power take-off shaft 27 of the engine is provided at one end only with a bearing 28 which, as indicated in Fig. 1, is supported by a wedge 29 slidably mounted on a supporting bracket 30 fixedly secured to one side portion of the body or platform 1. This wedge has longitudinal slots 31 through which are extended bolts 32 which engage bearing 28 at opposite sides of the power take-off shaft 27 and springs 33 are carried by the lower portions of the bolts and exert constant thrust upwardly against the bracket 30 and downwardly against adjustable nuts 34 on the bolts. Thus bearing 28 is held firmly on the wadge 29 but is capable of yielding upwardly when subjected to pressure.

A lever 35 is extended loosely through one end portion of the wedge 29 as at 29' in Figure 5 and is pivotally mounted at its lower end in a supporting bracket 36 extended from the post 15. Obviously by pressing this lever forwardly, the wedge 29 can be forced a desired distance under the bearing 28, thereby to adjust the engaged portion of shaft 27 upwardly whereas by moving the lever 35 in the opposite direction, the wedge can be partly withdrawn to permit the springs and gravity to lower bearing 28 and the shaft therein.

Figure 2:
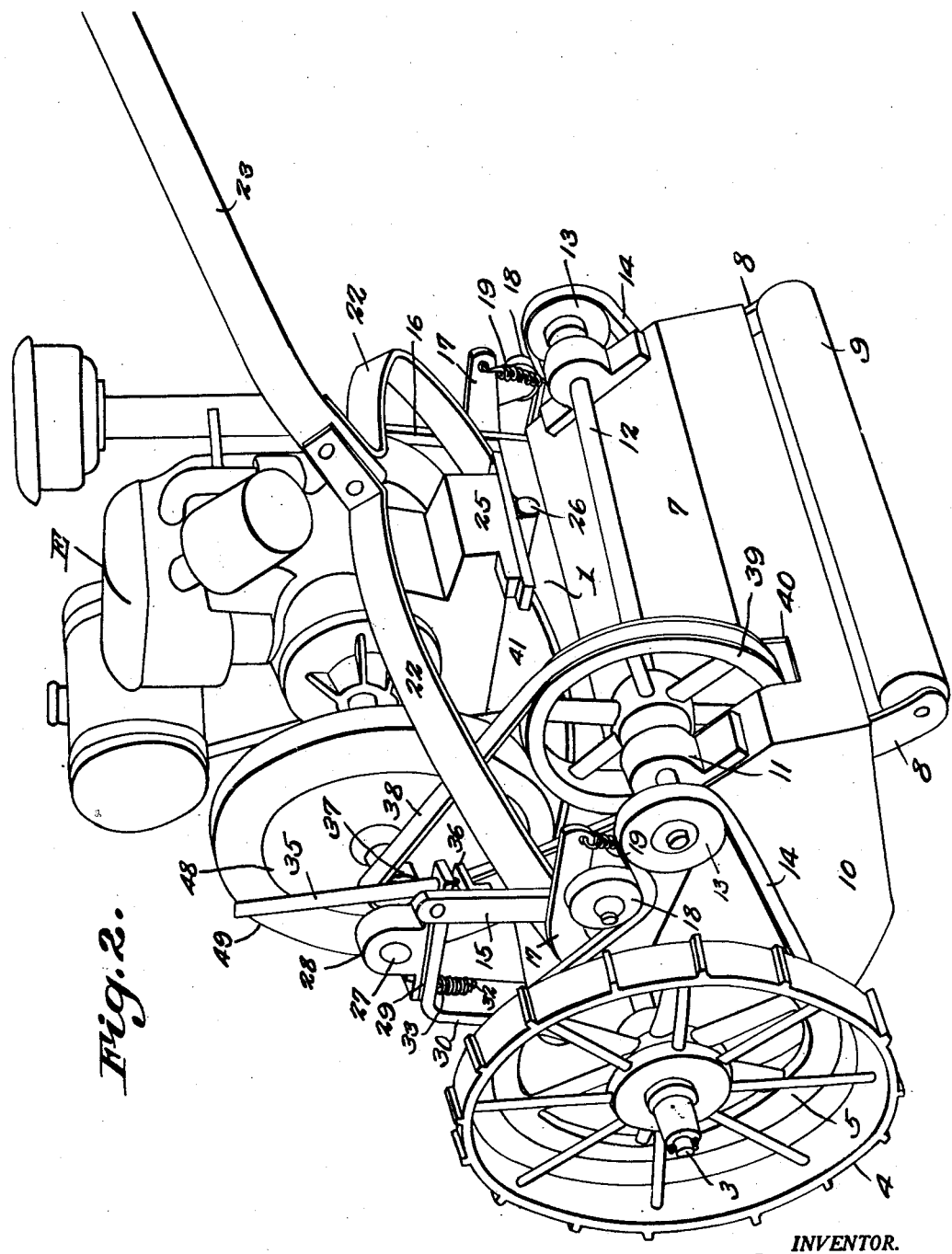
Figure 2 is a rear perspective view thereof.

A pulley 37 is secured on shaft 27 and is connected by a belt 38 to a driven wheel 39 secured to countershaft 12. To accommodate this wheel it is preferred to form a slot 40 in the hood or shield 7 as shown in Fig. 2.

A friction disk 41 is positioned close to and above the platform or body 1 and has a depending shaft 42 which is journalled in a bearing sleeve 43 extended downwardly through the body or platform 1, this sleeve being formed with an annular flange 44 at its upper end, which is bolted or otherwise secured onto the platform. Obviously the sleeve 43 can be provided with suitable anti-friction bearings whereby the shaft 42 may rotate freely therein. To the bottom of this shaft is secured a head 45 which, in turn, is fastened on a disk 46 from the periphery of which are extended knives 47. Any desired number of these knives can be employed and they can be located wherever deemed desirable. They are so arranged that, when the disk is rotated in one direction, the knives will cut a swath through grass or other vegetation in the path thereof.

Secured to the power take-off shaft 27 is a friction wheel 48 the periphery 49 of which can be of a suitable friction material which is in constant engagement with the friction disk 41. Obviously by manipulating the wedge 29 as heretofore explained, a frictional engagement between the wheel 48 and disk 41 can be regulated.

It will be apparent, of course, that when the wedge is shifted for the purpose of adjusting the shaft 27 and the engine for the purpose of regulating frictional engagement between the parts of the friction drive, the entire engine and its parts will rock on the platform or body 1 because of the rod 26 which constitutes a supporting bearing for the engine. The up-and-down movement of the bearing 28 due to the sliding action of the wedge is very slight. This is all that is necessary in order to break the frictional contact between the friction disc 41 and the periphery 49 of the friction wheel 48 and to reestablish a driving contact between the wheels. The movement is not enough to interfere with the transmission of motion from pulley 27 to belt 38 and thence to pulley 39.

In practice the engine is set in motion and if the wedge 29 is adjusted forwardly, the friction wheel 48 can be raised so that the disk 41 and the cutting elements will not be operated.

As only a very minute movement of wheel 48 is necessary to break frictional contact between it and the disc thereunder, it will be obvious that such movement will not produce slack in the belt which might interfere with the proper driving of the mechanism. Furthermore if the handle 24 is pressed downwardly the belts 14 will become slack and motion will not be transmitted to the wheels 4. By moving the wedge 29 rearwardly a desired distance, the periphery 49 of wheel 48 can be brought into frictional engagement with disk 41 so that said disk and the cutting elements will thus be rotated, the forwardly extended blades 49 rotating in the direction of the guard end. By then raising handle 24, the belts 14 will be made taut by the action of the springs 19, lever 17 and belt-tightening rollers 18 with the result that the entire structure will then move forwardly as the cutting elements rotate rapidly in one direction. As a result, any vegetation such as grass or the like in the path thereof, will be mowed. Obviously the handle 24 can be used not only for controlling the forward speed of the device but also for steering it. The extreme weight of the motor is ordinarily sufficient to hold it against displacement on its support while the apparatus is in use.

What is claimed is:

A lawn mower including a portable body structure, a disk mounted therebelow and supported thereby for rotation in a substantially horizontal plane, cutting elements extending from the periphery of the disk, a friction wheel connected to and rotatable with the disk, a motor mounted for lateral tilting on the structure, a shaft extending from one side of the motor, a bearing engaging the extended portion of the motor shaft and cooperating therewith to permit lateral tilting of the motor, a wedge slidably mounted beneath and constituting a support for the bearing, means for actuating the wedge to lift the bearing and tilt the motor, a friction wheel carried by said shaft and shiftable by the wedge to disengage from the first named friction wheel, and yielding means for maintaining frictional engagement between the friction wheels when the bearing and shaft are released for downward movement by movement of the wedge in one direction.

LEWIS BISHOP.

REFERENCES CITED

The following references are of record in the file of this patent:

UNITED STATES PATENTS

| Number | Name | Date |
| --- | --- | --- |
| 1,764,851 | Palm | June 17, 1930 |
| 1,767,510 | Carlson | June 24, 1930 |
| 1,966,972 | Seeley | July 17, 1934 |
| 2,097,351 | Smith | Oct. 26, 1937 |
| 2,166,450 | Smalley | July 18, 1939 |
| 2,278,922 | Goodall | Apr. 7, 1942 |
| 2,238,707 | Ronning | Apr. 15, 1941 |